June 29, 1948.   E. GORIN ET AL   2,444,289
PREPARATION OF PHOSGENE
Filed Aug. 13, 1945
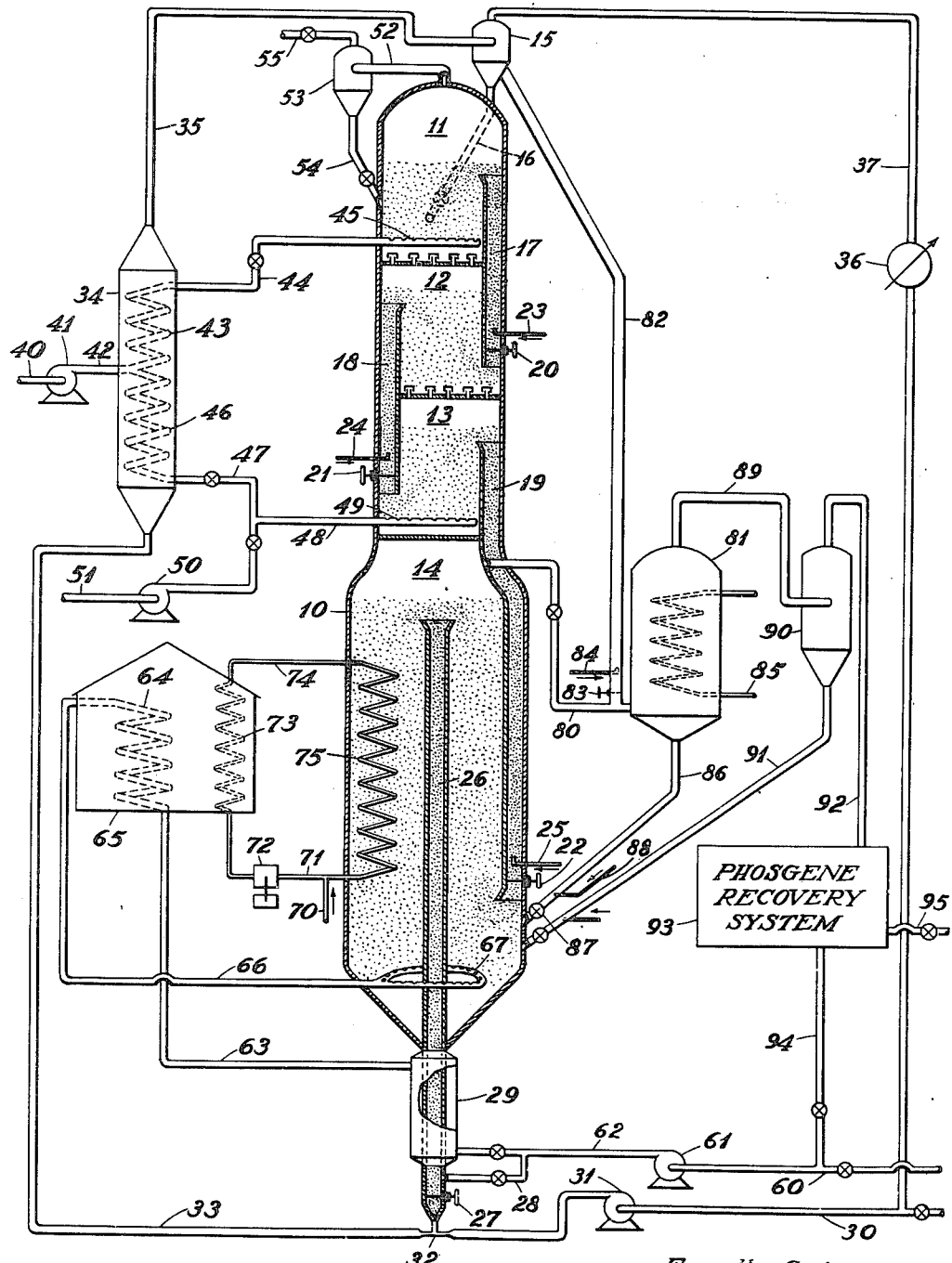
Everett Gorin
Charles Burke Miles
INVENTORS
BY John C. Stauffer
ATTORNEY Patented June 29, 1948

2,444,289

UNITED STATES PATENT OFFICE 2,444,289

PREPARATION OF PHOSGENE

Everett Gorin and Charles Burke Miles, Dallas, Tex., assignors, by mesne assignments, to Socony-Vacuum Oil Company, Incorporated, New York, N. Y., a corporation of New York Application August 13, 1945, Serial No. 610,606

9 Claims. (Cl. 260—544)

This invention relates to an improved method for the production of phosgene from carbon monoxide, hydrogen chloride and air. More particularly this invention is concerned with a continuous process whereby hydrogen chloride by-product from organic synthesis processes utilizing phosgene as an intermediate may be reconverted to said phosgene intermediate. In a more narrow sense this invention is concerned with a process whereby phosgene is produced by the interaction of carbon monoxide with cupric chloride.

Phosgene is acquiring ever-increasing use as an intermediate in the synthesis of organic chemicals. In many of these processes, part or all of the chlorine content of the phosgene is liberated as by-product hydrogen chloride. Examples of such processes include the reactions of phosgene with alcohols to produce dialkyl carbonates and alkyl chlorocarbonates, the reactions of phosgene with olefins to produce unsaturated acid chlorides and acids and the reactions of phosgene with paraffins to produce ketones and acid chlorides.

An object of the present invention is to produce phosgene from carbon monoxide, hydrogen chloride and air. Still another object of the invention is to utilize by-product hydrogen chloride for the production of phosgene intermediate in processes wherein the use of phosgene intermediate results in the production of by-product hydrogen chloride. A further object of the invention is to provide an integrated continuous process for the conversion of cuprous chloride to cupric chloride utilizing by-product hydrogen chloride and air for this initial step of the process and in a second step reacting the cupric chloride produced in said first step with carbon monoxide to produce phosgene. Other objects of the invention will become apparent from the description thereof which follows.

The process is essentially operated in two major steps comprising an oxidation-neutralization step and a chlorination step. The reaction occurring in the oxidation-neutralization step is essentially that described by the equation (1)     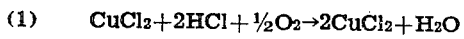

The reaction occurring in the chlorination step is essentially that described by the equation (2)     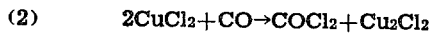

The process is preferably operated by using continuously circulating media to transfer the copper chloride chlorine carrier to and from the phosgene producing reaction zone. It is preferred to transfer and contact the copper chlorides with the gaseous reactants by means of highly porous refractory supports such as activated alumina, silica gel or acid treated clays in the form of finely divided particles of size less than 10 mesh and larger than 300 mesh, preferably 100 mesh to 200 mesh particle size. These refractory supports are impregnated with copper salts, as by immersing the powdered material in the molten salt, permitting the mixture to solidify, grinding the mass of porous solid supported copper chloride, and classifying to obtain the particle size of agent desired. By the term agent as used in the specification and claims is meant the copper chloride together with alkali metal chlorides, if any, plus the porous solid support thereof.

A preferred method for preparing the agent is to submit the refractory supporting material to a succession of alternate digestion and drying steps wherein solutions of the copper salts are used to superimpose successive increments of the copper salts on the support. Following the final drying step the mass of supported chloride or chlorides of copper is crushed and classified to give the desired range of particle size agent. The agent employed when the copper salt is in the cupric form should contain from 10 to 30 per cent by weight of copper, preferably from 15 to 20 parts by weight of copper on the supporting refractory material. If desired the impregnating salt may contain from 20 to 40 mol per cent, preferably 25 to 30 mol per cent of an alkali metal chloride such as potassium chloride. But in no case when alkali metal salt is present should the amount of impregnated salt exceed 60 to 65 per cent by weight of the total agent since the alkali metal salt lowers the melting point of the impregnating salt and "packing" of impregnated powder will result at higher concentration of salt in the agent, with a resulting interference with the powder transfer and contact with reactant gases. The presence of the alkali metal chloride, i. e., potassium chloride, catalyzes the oxidation of cuprous chloride and also reduces the volatility of cupric chloride in the chlorination step.

Contact of the copper chlorides with reactant gases is made by "hindered settling" technique or if desired the impregnated support may be in the form of larger particles of size within the range of from about 2 mesh to about 20 mesh in which case contact with the reactant gases is made by countercurrent flow of the impregnated support flowing by gravity counter to an ascending stream of said gases. However, it is preferred to operate with finely divided agent in hindered settling type operation as described in detail hereinbelow.

Referring now to the figure which represents diagrammatically an apparatus and the preferred method of operating the invention, tower 10 is a combination reactor which is divided into four reaction chambers 11, 12, 13 and 14, chambers 11, 12, and 13 being utilized as the oxidation-neutralization section of the tower and chamber 14 functioning as the chlorination or main reaction zone wherein the carbon monoxide is converted to phosgene. The oxidation-neutralization section of tower 10 is divided into the three separate reaction zones in order to obtain countercurrent flow of oxygen containing gas and hydrogen chloride gas against chlorine depleted copper chloride agent which is delivered to reactor 11 from cyclone separator 15 by means of dip leg 16. Standpipes 17, 18 and 19 are provided for transfer of the agent from reactor 11 to reactor 12, from reactor 12 to reactor 13, and from reactor 13 to reactor 14 respectively. As the powdered agent is put into a state of hindered settling by the upflowing reactant gases as described hereinbelow, the agent overflows into the standpipes. The bulk density of the agent in the standpipes is controlled by valves 20, 21, and 22 to a greater density than the hindered settled agent in the respective reactors from which the agent overflows and the agent is caused to flow in stages in a fluid-like stream from reactor 11 to reactor 14. The agent in standpipes 17 and 18 is fluidized by a relatively small amount of air injected to the standpipes via lines 23 and 24 respectively. The agent in standpipe 19 is fluidized by hydrogen chloride gas injected thereto via line 25.

The chlorination reaction zone 14 is provided with standpipe 26 which may be centrally located as indicated or it may be located near the inside wall of reactor 14. As the partially dechlorinated reagent is maintained in a hindered settling state, the reagent overflows into standpipe 26 and settles therein as a mass having a higher bulk density than the agent in the main body of reactor 14. The flow of agent downward through the standpipe 26 is regulated by valve 27, and the agent is fluidized therein by means of a small stream of carbon monoxide introduced to this standpipe via line 28 which leads from the main carbon monoxide feed line. Standpipe 26 is equipped with heat exchanger 29 wherein the hot partially dechlorinated agent is cooled to a temperature below about 400° C. by heat exchange with the carbon monoxide feed stream to the phosgene producing reactor 14.

Relatively cold oxygen depleted air in line 30 is picked up by multistage blower 31 and is passed through injector 32 where the air picks up dechlorinated agent from the base of standpipe 26. The agent is preferably only partially dechlorinated, and the cupric content of the agent in standpipe 26 should be within the range of from about 35 to 45%, with the balance reduced to cuprous copper. The air at a pressure in excess of the pressure in reactor 14 carries the agent through line 33, heat exchanger 34 and line 35 to cyclone separator 15. The agent separated in 15 may be delivered to a hopper, not shown in the drawing, which feeds the same to reactor 11 or the agent may be delivered, as shown, directly to reactor 11 by means of dip leg 16. If desired, heat exchanger 34 may be eliminated, cooling of the carrier gas being accomplished by means of cooler 36 in carrier gas recycle line 37 which leads to blower feed line 30. As the carrier gas is continuously recycled through lines 30, 33, 35 and 37, it becomes more depleted with respect to oxygen content as a result of the tendency to oxidize the cuprous chloride content of the agent to cupric oxychloride. Makeup air to replace the oxygen removed from the carrier gas by line oxidation of the agent is introduced to line 30 from an external source as shown.

The agent at a temperature within the approximate range of 320° C. to 350° C. is delivered to reactor 11 at a pressure within the range of from about 5 atmospheres to about 10 atmospheres. Air in line 40 is picked up by multistage blower or compressor 41 and passed in part through line 42 to coil 43 in exchanger 34 where it is preheated to a temperature preferably above 300° C. The air is passed through line 44 to air distributing plate 45 at the base of reactor 11. The remainder of the air in line 42 is passed through coil 46 for pickup of heat and thence by lines 47 and 48 to distributing plate 49 in reactor 13. Hydrogen chloride at a pressure of 5 to 10 atmospheres is introduced to the process by means of a multistage blower 50 in line 51 which connects with line 48. Thus, a mixture of oxygen containing gas, such as air, and hydrogen chloride is delivered to reactor 13 by means of distributing plate 49. The mol ratio of hydrogen chloride to total oxygen introduced to reactors 11 and 13 should be within the range of 4 to 1 and 6 to 1. In case a part of the oxygen is introduced to reactor 11, the ratio of hydrogen chloride to oxygen in the mixed gases introduced to reactor 13 is at least 4 to 1. If desired, all of the air may be passed through coil 46 and lines 47 and 48 leading to reactor 13, the oxidation of the agent in reactor 11 being accomplished by residual oxygen in the gas leaving reactor 12. However, it is preferred to introduce a part of the air directly to reactor 11 in order to insure preoxidation of the agent prior to contact with hydrogen chloride as hereinafter described.

The temperature of the agent as it enters reactor 11 will usually be within the range of from about 320° C. to about 345° C. and as the power is fluidized by the air ascending from plate 45, the temperature rises rapidly due to the exothermic heat of conversion of the cuprous chloride of the agent to cupric oxychloride. The temperature of the partially oxidized agent as it overflows into standpipe 17 will be within the range of from about 350° C. to about 375° C. and the average cupric content of the copper salt components of the agent will be raised in reactor 11 about 9 per cent, i. e., from a range of 35 to 45% as the agent enters the reactor to a range of 44 to 54% as the agent overflows into standpipe 17. Reactor 11 which may be designated as the primary oxidation zone is operated at a pressure within the range of 5 to 10 atmospheres, the pressure being less than the pressures in reactors 12, 13 and 14. The depth of fluidized bed in reactor 11 is suitably within the range of from about 8 to about 12 feet, preferably about 10 feet. The average residence time of the agent in reactor 11 usually will be within the range of from about 20 seconds to about 90 seconds while the mean residence time of the oxidizing gas in the fluidized mass of agent ordinarily will be within the range of from about 3 to about 12 seconds. The linear velocity of the upflowing gas in reactor 11 will be correspondingly within the range of from about 1 foot to 4 feet per second. The gas, partially spent with respect to oxygen content, passes from reactor 11 through line 52 to cyclone separator 53. Separated agent is returned to reactor 11 through dip leg 54 and the oxygen depleted air is passed from the process via line 55. Dip legs 54 and 16 are aerated by means of air introduced thereto above the indicated valves in said dip legs.

Reactor 12 is designated as the secondary oxidation zone or the primary neutralization zone since in this zone the oxidized agent first contacts hydrogen chloride which enters reactor 12 through the bubble capped perforated plate which separates reactor 13 from reactor 12. As the oxidized agent flows from standpipe 17 into reactor 12 at a temperature within the range of from about 350° C. to about 375° C. it is fluidized by the residual gas from reactor 13 containing nitrogen, oxygen and hydrogen chloride which escape reaction in 13 and any chlorine formed by the oxidation of hydrogen chloride in reactor 13. The residence times of this residual gas and of the agent in reactor 12 approximates the corresponding residence times of gas and agent in reactor 11 and the average cupric content increases from a range of 44-54% to a range of from about 64 to 74% cupric copper based on the total copper in the agent as the average temperature of the fluidized mass increases from the range of 350-375° C. to the range of from about 420-445° C. The agent overflows into standpipe 18. The residual gas from reactor 12 containing predominantly nitrogen, small amounts of oxygen and a trace of hydrogen chloride passes upward through the bubble capped openings in the plate at the bottom of reactor 11 wherein the last traces of hydrogen chloride are removed by neutralization of the copper oxychloride. If all of the oxygen containing gas is introduced to the cupric chloride regeneration step through coil 46 and lines 47 and 48, the oxygen content of the gas entering reactor 11 from reactor 12 will be much higher and this oxygen is removed in large part by the oxidation of the cuprous chloride in the agent.

In reactor 13, which is primarily a neutralization zone, the agent delivered via standpipe 18 is fluidized in hindered settling operation, the conversion of the cupric oxychloride of the agent to cupric chloride being substantially completed in this zone. The cupric chloride of the copper chloride content of the agent is raised from the range of 64-74% to the range of 85-95% in reactor 13 by the action of the mixture of air and hydrogen chloride in the fluidizing gas introduced by distributing plate 49 as described hereinabove. The depth of the fluidized bed in reactor 13 is somewhat greater than in reactors 11 and 12, thus permitting a longer contact time of the reactant gas with the fluidized agent. Thus, the range of depth of hindered flow reactant bed is from about 10 feet to about 16 feet, preferably about 13 or 14 feet in reactor 13. The average contact time of the gas with the agent is within the range of 2 to about 20 seconds while the average residence time of the agent in reactor 13 is within the range of from about 45 to about 360 seconds, preferably about 100 seconds. The reaction of hydrogen chloride with cupric oxychloride to form cupric chloride is highly exothermic and hence the temperature of the agent is increased from the range of 420° C.–445° C. to the range of 500° C.–525° C. as the fluidized agent overflows into standpipe 19. As indicated hereinabove, reactor 13 is operated under a pressure of from 5 to 10 atmospheres and hence decomposition of the cupric chloride in reactor 13 is minimized. Any chlorine produced by such decomposition is reabsorbed by the cuprous chloride enriched agent in reactors 11 and 12. Thus, in passing through the three stage cupric chloride regeneration zone the cupric copper content of the agent is increased from a range of 35-45% cupric copper to 85-95% cupric copper while the temperature of the agent is raised from a range of 320-345° C. to a range of 500°-525° C. for delivery via standpipe 19 to the phosgene producing reactor 14.

Carbon monoxide in line 60 is picked up by means of multistage blower or compressor 61 and is passed through line 62 to heat exchanger 29 where it is heated by the partially dechlorinated agent from standpipe 26. From exchanger 29 the carbon monoxide is passed through line 63 through heating coil 64 in furnace 65 and thence through line 66 to distributor coil 67 at the base of reactor 14. As the carbon monoxide is forced into reactor 14 the cupric chloride enriched agent is fluidized to a depth of from about 35 to 50 feet, preferably about 40 feet and the average cupric copper content of the agent is reduced from the range of 85-95% to about the range 35 to 45% cupric copper. The carbon monoxide is converted to phosgene and a small amount of free chlorine is also produced.

The reaction of cupric chloride with carbon monoxide to form phosgene is slightly endothermic and hence heat must be supplied to reactor 14 to maintain the temperature of the agent above 475° C. and preferably in the range of 500° C. to 525° C. A temperature in reactor 14 of at least 500° C. is preferred in order to obtain economic conversion rates at residence times of the carbon monoxide within the range designated hereinbelow. This may be accomplished in one or all of three ways. For example, the temperature of the agent may be allowed to build up sufficiently in the cupric chloride regeneration step in reactors 12 and 13 as described above in order to store heat in the agent. This method, if used exclusively, has the disadvantage of decomposing the cupric chloride and/or vaporizing the copper salts from the agent in the regeneration step. Hence, the above temperature range limitation is set for the agent transferred from reactor 13 via standpipe 19. A second method of supplying the necessary endothermic heat to reactor 14 is to preheat the carbon monoxide to a temperature of 625° C. to 650° C. in furnace 65. The exclusive use of this method is not desirable due to the excessive amount of heating surface required in heating coil 64 and it is desirable to limit the preheat temperature of the carbon monoxide feed to the range of 500° C.–550° C. A third method, which is illustrated in the drawing, is to circulate a heat transfer medium such as a molten metal or an eutectic salt mixture through coils in furnace 65 and thence through coils immersed in the fluidized agent in reactor 14 to furnish by direct heat transfer the necessary heat to maintain the temperature of the agent above about 500° C. in 14. Thus, a liquid heating medium is introduced from line 70 leading to line 71 by means of pump 72 and the liquid is circulated through coil 73 in furnace 65 and thence through line 74 and coil 75 which connects with line 71. When operating reactor 14 at 500° C. the agent may be introduced via standpipe 19 in the temperature range of 500°-525° C.

and the carbon monoxide must then be preheated to a temperature in excess of 550° C. On the other hand, if agent is introduced to reactor 14 in the range of 475° C.–500° C. it becomes desirable to supply heat by means of coil 75.

The contact time of the carbon monoxide in reactor 14 is preferably within the range of from about 1 minute to about 6 minutes to give a conversion per pass of carbon monoxide to phosgene of from 15% to 30%. A relatively low linear velocity of carbon monoxide through the fluidized mass is desirable in order to maintain as long contact time in the above range as is compatible with maintenance of efficient hindered settling. Linear velocities within the range of from about 0.2 foot to 0.5 foot per second are used in reactor 14, preferably from about 0.3 foot to about 0.4 foot per second. Higher linear velocities, generally greater than 0.5 foot per second are used in reactors 11, 12, and 13.

The relatively high temperatures prevailing in reactor 14 cause some vaporization of copper salts. However, the loss of copper salts from the agent is minimized by operating reactor 14 in the upper part of the range of from 5 to 10 atmospheres designated hereinabove. The gas from the fluidized mass in reactor 14 which consists of unreacted carbon monoxide, phosgene, a small amount of chlorine, a small amount of volatilized copper chlorides and also some suspended agent passes through valved line 80 to dust chamber 81. Relatively cold cupric chloride depleted agent is injected into the gas stream in line 80 through standpipe 82 leading from cyclone separator 15 or from the hopper (not shown) into which cyclone separator 15 delivers agent. Agent in standpipe 82 is aerated with a small amount of oxygen depleted air introduced above control valve 83 through line 84. The gaseous product stream containing suspended agent is further cooled to a temperature in the range of from about 275° C. to 375° C. by cooling coil 85 in chamber 80. The copper salt is selectively adsorbed on the agent which then settles into standpipe 86, fluidized by means of carbon monoxide introduced thereto, at a point above valve 87, through line 88 and the agent carrying the absorbed copper salt passes back to reactor 14 thus being retained in the system. The gaseous product carrying a part of the suspended solid passes overhead from chamber 81 through line 89 to cyclone separator 90 whence separated agent is returned to reactor 14 through carbon monoxide fluidized dip leg 91. The overhead product gas from separator 90 passes through line 92 to the phosgene recovery system 93 where the gas is cooled to normal atmospheric temperature and is recovered, for example, by absorption in a countercurrent stream of a suitable solvent for the phosgene such as xylene, a kerosene fraction or a chlorinated hydrocarbon such as ethylene dichloride. The nonabsorbed gas comprising carbon monoxide and a major part of the chlorine is recycled to reactor 14 through line 94 which connects with carbon monoxide feed line 60. The recycled chlorine combines directly with carbon monoxide to form phosgene under the above conditions of operation of reactor 14 and hence does not accumulate in the carbon monoxide conversion cycle. The solution of phosgene obtained in the phosgene recovery system is stripped to recover phosgene containing a trace of chlorine which product is withdrawn from the process through line 95.

The operation of reactor 14 is illustrated by the following example: 1,380,000 pounds per day of 120 mesh to 200 mesh agent containing 20 grams of copper per 100 grams of agent, of which copper 93% is in the form of cupric chloride, are fluidized in hindered settling operation by 1,728,000 cubic feet of carbon monoxide measured at standard conditions but introduced to reactor 14 at a pressure of 6.6 atmospheres and at an average temperature of 500° C. in a reactor of 6 feet inside diameter, the depth of the fluidized bed being approximately 40 feet. The linear velocity of the carbon monoxide in the fluidized bed under these conditions of operation is about 0.4 foot per second. The cupric copper content of the agent is reduced from 93 per cent in the feed to an average 43 per cent in standpipe 26 and there is produced a gaseous product containing about 22 mol per cent phosgene and about 5 mol per cent chlorine at the rate of approximately 110,000 pounds of phosgene per day.

In the above description of the process the agent consists of a porous refractory solid impregnated with copper salts alone. However, as indicated hereinabove it may be desirable to operate with an alkali metal chloride such as potassium chloride incorporated with the copper chlorides on the refractory carrier in which case the temperature in reactor 13 is maintained at a lower level, i. e., in the range of from about 465° C. to about 485° C. Residence times of the gases and agent in the reactors are approximately the same as used when the potassium chloride is not a component of the agent. The temperature in reactor 14 is maintained at about 500° C. We have found the reaction in reactor 14 to be substantially thermo neutral in the presence of potassium chloride, and hence the only heat requirement in reactor 14 is the heat necessary to replace the heat lost by radiation and also the heat necessary to raise the temperature of the agent from the range of 465°–485° C. to the range of 500° C.–525° C. This temperature can be maintained by preheating the carbon monoxide and by the addition of less heat via coil 75. The cupric content of the copper chloride in the agent as it enters reactor 14 should preferably be within the range of 85 to 90 per cent. The agent should contain above 55 per cent cupric copper as it leaves reactor 14. Thus, a smaller change in cupric concentration is advisable when using the potassium chloride activated agent.

The process may also be operated at pressures below the above operating range, that is, at pressures only slightly above atmospheric pressure. However, economical conversion rates of carbon monoxide to phosgene by the use of cupric chloride impregnated agent is favored by super atmospheric pressure operation. Higher pressures than 10 atmospheres are advantageous, the pressure of operation being limited primarily by the apparatus and type of contacting process employed. Although we prefer to operate reactor 14 at temperatures within the range of 500° C. to 525° C., we do not wish to be limited to this range. For example, we may operate this reactor at temperatures up to 550° C. Higher pressures than 10 atmospheres are usually desirable when operating at temperatures above 525° C. in order to minimize volatilization of the copper salts. High pressure operation is desirable since a high ratio of phosgene to chlorine in the product gas may be maintained and higher throughput for a given reactor size is possible if high pressures are used in reactor 14.

The process described above is adiabatic to the extent that the heat generated in the oxidation of by-product hydrogen chloride is utilized in a unitary coordinated process for the production of phosgene. The process is particularly adaptable for the production of phosgene intermediate in those chemical processes wherein the use of phosgene intermediate results in the production of large volumes of by-product hydrogen chloride.

While the preferred embodiment of the invention has been described, it is understood that this illustration is only by way of example and that many other modifications and alternative processes fall within the scope of the invention.

We claim:

1. A process for the manufacture of phosgene comprising the steps of (1) contacting in a reaction zone a mixture of the chlorides of copper comprising a major proportion of cupric chloride and a minor proportion of cuprous chloride disposed on a porous refractory carrier at a temperature within the range of from about 500° C. to about 525° C. and at a pressure within the range of from about five atmospheres to about ten atmospheres with an amount of carbon monoxide in excess of that required to react with said cupric chloride to form a gaseous product comprising phosgene and unreacted carbon monoxide, (2) recovering phosgene from the gaseous product of step 1, (3) heating the residue gas from step 2 comprising carbon monoxide to a temperature in excess of 525° C. to supply heat in the reaction zone of step 1, and (4) recycling the heated residue gas of step 3 to step 1 of the process.

2. A continuous process for the manufacturing of phosgene comprising the steps of (1) continuously passing an oxygen containing gas in contact with a cuprous chloride containing contact mass in a reaction zone to convert at least a part of said cuprous chloride to cupric oxychloride, (2) continuously contacting the oxidized contact mass from step 1 with a mixture of an oxygen containing gas and hydrogen chloride while controlling the resultant exothermic reaction to prevent the temperature from exceeding 525° C. in at least one reaction zone separate from the reaction zone of step 1 to produce additional cupric oxychloride in said contact mass and to convert the cupric oxychloride therein to cupric chloride, (3) continuously contacting the cupric chloride containing mass of step 2 in a third reaction zone directly without intermediate cooling with an amount of carbon monoxide in excess of that amount required to react with said cupric chloride at a temperature within range of from 500° C. to 525° C. and at a pressure within the range of from 5 to 10 atmospheres to form a gaseous mixture comprising phosgene, chlorine and carbon monoxide and to form a cuprous chloride enriched contact mass, (4) continuously circulating the cuprous chloride enriched contact mass of step 3 to step 1, (5) fractionating the gaseous reaction product of step 3 to produce a phosgene fraction and a residual gas fraction, and (6) continuously circulating said residual gas fraction from step 5 to step 3 of the process.

3. The process of claim 2 wherein residual gas recovered in step 5 is heated before being circulated to step 3 of the process.

4. The process as described in claim 2 wherein the cupric copper content of the mass of step 3 amounts to at least 85% of the total copper in said mass.

5. A continuous process for the manufacture of phosgene from hydrogen chloride, carbon monoxide and air comprising the steps of (1) continuously contacting in a reaction zone porous refractory solid supported cuprous chloride reactant with a gaseous mixture comprising a major proportion of residual air and residual hydrogen chloride introduced to said reaction zone as hereinafter described whereby at least a part of said cuprous chloride is oxidized to cupric oxychloride and said residual hydrogen chloride is reacted with said cupric oxychloride to form cupric chloride, (2) continuously passing the supported reactant of step 1 to and through at least one separate reaction zone in contact with a gaseous mixture of air and hydrogen chloride to augment the extent of conversion of said cuprous chloride to cupric oxychloride and to increase the conversion of the cupric oxychloride to cupric chloride, (3) continuously passing the residual gas from step 2 to step 1, (4) continuously passing the supported reactant of step 2 to and through a third reaction zone in contact with an amount of carbon monoxide in excess of that amount required to react with the cupric chloride formed in steps 1 and 2 and at a temperature within the range of from 475° C. to 525° C. to form a gaseous mixture comprising phosgene, chlorine and carbon monoxide and to form a cuprous chloride enriched contact mass, (5) continuously circulating the cuprous chloride enriched contact mass of step 4 to step 1, (6) fractionating the gaseous mixture of step 4 to produce a phosgene fraction and a residual gas fraction, and (7) continuously circulating said gas fraction from step 6 to step 4 of the process.

6. A continuous process for the manufacture of phosgene from hydrogen chloride, carbon monoxide and oxygen which comprises the steps of (1) introducing a contact mass comprising a major portion of cuprous chloride and a minor portion of cupric chloride supported on a porous refractory carrier into at least one reaction zone at a temperature above about 320° C., (2) contacting the supported cuprous chloride in said at least one reaction zone first with an oxygen containing gas to convert at least a part of the cuprous chloride to cupric oxychloride and then with a mixture of oxygen containing gas and hydrogen chloride to convert additional cuprous chloride to cupric oxychloride and to convert the cupric oxychloride therein to cupric chloride while controlling the exothermic reaction to prevent the temperature from exceeding 525° C., (3) transferring the cupric chloride enriched contact mass from step 2 and introducing it directly without intermediate cooling into a separate reaction zone, (4) contacting the contact mass in said separate reaction zone with carbon monoxide while maintaining a temperature within the range of from 475° C. to 525° C. and a pressure within the range of from about 5 to about 10 atmospheres to form phosgene and to reduce at least a substantial portion of the cupric chloride in the contact mass to cuprous chloride, (5) continuously recycling the contact mass withdrawn from step 4 to step 1 and (6) recovering the phosgene from the separate reaction zone.

7. The process as described in claim 6 wherein the carrier is activated alumina.

8. The process as described in claim 6 wherein the contact mass of step 1 comprises a porous refractory solid impregnated with a mixture of cuprous chloride, cupric chloride and potassium chloride.

9. A continuous process for the manufacture of phosgene from hydrogen chloride, carbon monoxide and oxygen which comprises (1) introducing a contact mass comprising cuprous chloride supported on a finely divided porous refractory carrier into a first reaction zone at a temperature between about 320° C. and about 345° C., (2) contacting the supported cuprous chloride in the first reaction zone with oxygen by suspending the carrier in an upflowing stream of an oxygen containing gas under hindered settling conditions to convert at least a portion of the cuprous chloride to cupric oxychloride, (3) continuously removing a portion of the contact mass containing cupric oxychloride without intermediate cooling and introducing it into a second separate reaction zone, (4) contacting the mass in the second reaction zone with a mixture of oxygen and hydrogen chloride by suspending the powdered carrier in an upflowing stream of a mixture of oxygen containing gas and hydrogen chloride under hindered settling conditions to convert additional cuprous chloride to cupric oxychloride and to convert the cupric oxychloride therein to cupric chloride while controlling the exothermic reaction to prevent the temperature from exceeeding 525° C., (5) continuously withdrawing a portion of the contact mass containing the cupric chloride and transferring it directly without intermediate cooling to a third reaction zone, (6) contacting the mass in the third reaction zone with carbon monoxide by suspending the powdered carrier in an upflowing stream of gaseous carbon monoxide under hindered settling conditions to form phosgene and to reduce at least a portion of the cupric chloride to cuprous chloride while maintaining a temperature within the range of from 475° C. to 525° C. and a pressure within the range of from 5 to 10 atmospheres, (7) continuously withdrawing the contact mass from the third reaction zone and recycling it to step 1 and (8) recovering phosgene from the third reaction zone.

EVERETT GORIN.
CHARLES BURKE MILES.

REFERENCES CITED

The following references are of record in the file of this patent:

UNITED STATES PATENTS

| Number | Name | Date |
| --- | --- | --- |
| 1,511,646 | Weaver | Oct. 14, 1924 |
| 1,915,618 | Ralston et al. | June 27, 1933 |

FOREIGN PATENTS

| Number | Country | Date |
| --- | --- | --- |
| 214,293 | Great Britain | Apr. 14, 1924 |

OTHER REFERENCES

Gobel: Journal für praktische Chemie (1835), vol. 6, pages 387–388.

Homan: Liebigs Annalen, vol. 70 (1849), page 139.

Diemer: Jour. Am. Chem. Soc., vol. 35 (1913), pages 554–555.

Belladen et al.: Gazz. Chimica Italiana, vol. 58 (1928), pages 443–449.